(12) United States Patent
Kluge et al.

(10) Patent No.: US 10,593,963 B2
(45) Date of Patent: Mar. 17, 2020

(54) BLOCKING LAYER

(75) Inventors: Claus Peter Kluge, Roslau (DE); Stefan Stolz, Waldershof (DE)

(73) Assignee: CeramTec GmbH, Plochingen (DE)

( * ) Notice: Subject to any disclaimer, the term of this patent is extended or adjusted under 35 U.S.C. 154(b) by 951 days.

(21) Appl. No.: 12/743,577

(22) PCT Filed: Dec. 4, 2008

(86) PCT No.: PCT/EP2008/066783
§ 371 (c)(1),
(2), (4) Date: Aug. 18, 2010

(87) PCT Pub. No.: WO2009/071624
PCT Pub. Date: Jun. 11, 2009

(65) Prior Publication Data
US 2010/0310968 A1 Dec. 9, 2010

(30) Foreign Application Priority Data
Dec. 4, 2007 (DE) .................... 10 2007 058 596

(51) Int. Cl.
*H01M 8/02* (2016.01)
*H01M 8/0236* (2016.01)
(Continued)

(52) U.S. Cl.
CPC ....... *H01M 8/0236* (2013.01); *H01M 8/1213* (2013.01); *H01M 2008/1293* (2013.01)

(58) Field of Classification Search
CPC .... C01B 2203/0233; C01B 2203/0283; C01B 2203/044; C01B 2203/047;
(Continued)

(56) References Cited

U.S. PATENT DOCUMENTS 4,404,267 A * 9/1983 Iacovangelo et al. ........ 429/474
4,500,566 A * 2/1985 Karas et al. .................. 427/115
(Continued)

FOREIGN PATENT DOCUMENTS

EP 0 889 536 A 1/1999
FR 2 180 488 A 11/1973
JP 2008186798 A * 8/2008

OTHER PUBLICATIONS

MAchine translation in English of JP 2008186798.*

*Primary Examiner* — Robert S Jones
*Assistant Examiner* — Claire L Roe
(74) *Attorney, Agent, or Firm* — Norton Rose Fulbright US LLP

(57) ABSTRACT

The invention relates to an anode and electrolyte and cathode in direct material contact in fuel cell applications, so that the anode and electrolyte, and the cathode and electrolyte, particularly at temperatures >400° C., can react in a solid chemical manner. Said reaction results in that the material of the anodes can diffuse into the electrolyte and vice versa, and the material of the cathodes can diffuse into the electrolyte or vice versa. The effect thereof is the modification of the electrical energy yield of the fuel cells. In order to prevent said effect, it is proposed according to the invention that a blocking layer is disposed between the electrolyte and anode and electrolyte and cathode and is made of areas having opened and closed pores and that the functional penetration paths for the diffusion are formed by the frame structure thus created.

23 Claims, 2 Drawing Sheets

(51) Int. Cl.
*H01M 8/1213* (2016.01)
*H01M 8/124* (2016.01)

(58) Field of Classification Search
CPC ....... C01B 2203/066; C01B 2203/0811; C01B 2203/0822; C01B 2203/0827; C01B 2203/0894; C01B 2203/1047; C01B 2203/1058; C01B 2203/1223; C01B 2203/1241; C01B 2203/127; C01B 2203/1276; C01B 2203/1604; C01B 2203/1619; C01B 2203/1633; C01B 2203/1685; C01B 2203/169; C01B 2203/1695; F28D 9/0093; H01M 2250/405; H01M 8/04022; H01M 8/04395; H01M 8/0612; H01M 8/0687; H01M 8/04141; H01M 8/04156; H01M 8/04201; H01M 8/0668; H01M 8/04753; H01M 8/04067; H01M 8/04029; H01M 8/247; H01M 8/04089; H01M 8/0618; H01M 8/4164

USPC .................................. 429/512–514, 523, 535
See application file for complete search history.

(56) References Cited

U.S. PATENT DOCUMENTS

| | | | | |
|---|---|---|---|---|
| 5,079,104 | A * | 1/1992 | Roche .................. | H01M 8/0271 429/453 |
| 6,368,383 | B1 * | 4/2002 | Virkar .................. | B01D 53/228 95/54 |
| 6,492,051 | B1 * | 12/2002 | Gopalan ............. | H01M 4/9033 429/486 |
| 6,605,381 | B1 * | 8/2003 | Rosenmayer ....... | H01M 8/0234 29/623.1 |
| 6,630,267 | B2 * | 10/2003 | Badding et al. .............. | 429/488 |
| 2005/0095495 | A1 * | 5/2005 | Yamada et al. .................. | 429/44 |
| 2009/0136787 | A1 * | 5/2009 | Kozak ................ | B01D 67/0088 429/483 |
| 2011/0305973 | A1 * | 12/2011 | Kobayashi .......... | H01M 4/8657 429/496 |

* cited by examiner

BLOCKING LAYER

RELATED APPLICATIONS

This application is a § 371 application from PCT/EP2008/066783 filed Dec. 4, 2008, which claims priority from German Patent Application No. 10 2007 058 596.0 filed Dec. 4, 2007, each of which is herein incorporated by reference in its entirety.

The invention relates to a blocking layer in a fuel cell for preventing reactions between the electrolyte and anode and the electrolyte and cathode.

The anode and the electrolyte and also the cathode and the electrolyte are in direct material contact in fuel-cell applications. In particular, high-temperature fuel cells, for example SOFC (solid oxide fuel cells), with working temperatures >400° C. are to be mentioned here. In accordance with the prior art, the anode and the electrolyte and also the electrolyte and the cathode react at temperatures >400° C. in a solid chemical manner. This reaction results in the material of the anodes being able to migrate into the electrolyte or vice versa, or that material of the cathodes can migrate into the electrolyte or vice versa. The effect thereof is the change in the electrical energy yield of the fuel cells. This change is a process that is accelerated by rising temperatures and/or sustained duration.

Figure 1:
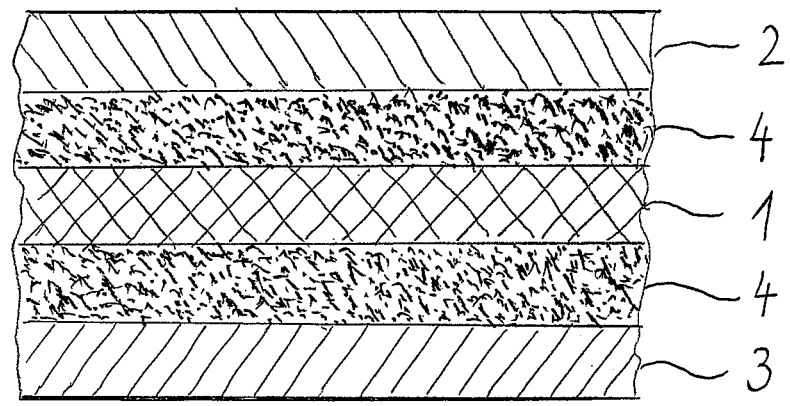

In order to prevent the diffusion, at the present time blocking layers are used whose property is a material density that is as high as possible, a so-called dense structure, as shown in FIG. 1 as prior art. FIG. 1 diagrammatically shows the layer structure in a conventional fuel cell. The electrolyte is denoted by 1, the anode by 2, and the cathode by 3. The particularly dense blocking layer 4 lies between the electrolyte 1 and the anode 2 and also between the electrolyte 1 and the cathode 3. It is difficult, however, on the one hand to produce a structure that is dense, yet on the other hand not to make the layer so thick that the chemical processes are hindered in the cell.

The object of the invention consists in putting forward a blocking layer that eliminates the solid chemical reactions between the electrolyte and the anode and cathode to the greatest possible extent.

The object is achieved with the aid of the characterising features of the first claim; advantageous developments of the invention are claimed in the dependent claims.

Figure 2:
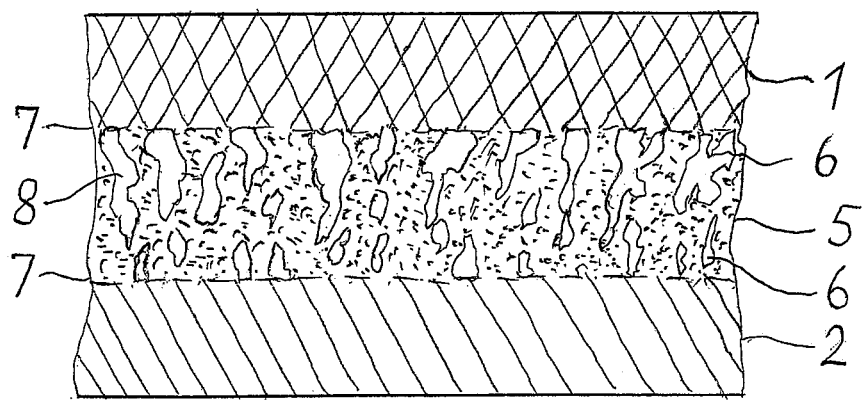

In contrast with the prior art, in accordance with the invention a porosity is introduced into the blocking layer in a controlled manner, as shown in FIG. 2. In FIG. 2 a blocking layer 5 in accordance with the invention with pores 6 lies between the electrolyte 1 and the anode 2. The imaginary boundary lines between the individual layers are denoted by 7. An increase in the pores 6 and pore channels 8, the porosity, can be seen in opposition to the direction of diffusion—electrolyte 1 towards the anode 2. The blocking layer 5 thus contains open-pored and/or closed-pored areas, as a result of which the material of the blocking layer 5 forms a frame structure.

As a result of the pores 6 a deficiency of material is produced in which diffusion can take place, because only the frame structure formed by the material of the blocking layer presents the possibility for diffusion. It is not the pore 6 as a hollow space that is the actual functional carrier, but the frame structure. The pore, whether open or closed, is therefore intended to displace material. As a result of the pores, solid chemical reaction paths which are as narrow as possible are created that hinder free or large-area diffusion from the anode into the electrolyte or vice versa and/or from the cathode into the electrolyte or vice versa.

The blocking layer is an electrochemical functional layer and preferably consists of a ceramic material.

The layer thickness of the blocking layer amounts to 0.1 to 40 µm. It is dependent upon the particle size which in turn has influence upon the size of the pores. As a rule, with a small particle size of the material, a small pore diameter and a large proportion of pores, the selected thickness of the blocking layer can be small. No channels may develop through open pores through the blocking layer that render possible percolation of the material or cause a short circuit. If the functional layer is too thick, the electrical resistance rises and the energy discharge out of the fuel cell becomes lower. The thickness and the porosity are parameters that can be used as a definition for this functional layer.

Figure 3:
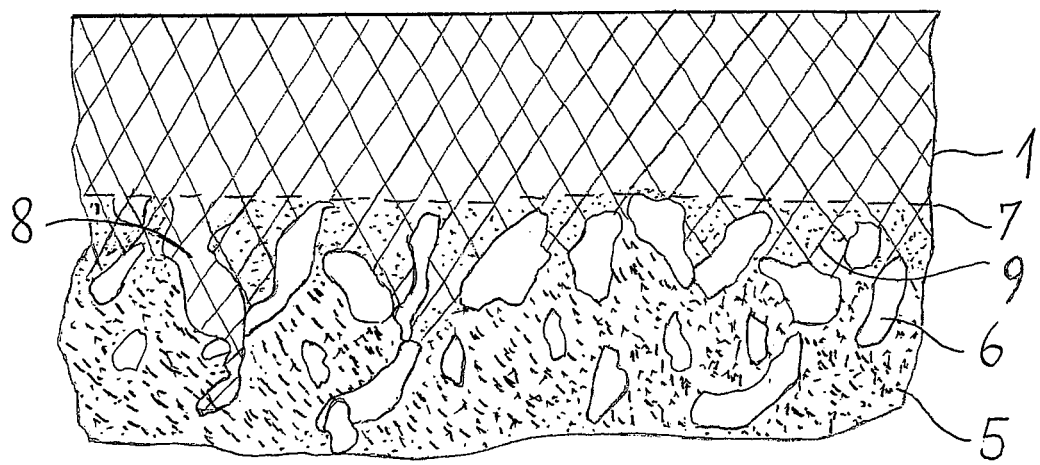

As shown in FIG. 3, an enlarged cutaway portion from FIG. 2, the material of the layer of the electrolyte 1 adjacent to the blocking layer has penetrated into the open pores 6 and into the pore channels 8 formed in the blocking layer so that as a result a mechanical tooth construction with the adjacent blocking layer 5 occurs. Furthermore, the material of the electrolyte has diffused by way of the imaginary boundary line 7 between the pores 6 into the material of the blocking layer 5 and there forms a diffusion area 9. Further diffusion is, however, prevented by the pores 6 interrupting the diffusion route.

Material paths develop in the blocking layer as a result of the porosity, as already explained. These lengthen the diffusion stretch for the material that is diffusing in, as can be seen from FIGS. 2 and 3. The route for the diffusion between two functional layers goes via the frame structure, that is, not necessarily in a straight line. Thus in the individual case the stretch is lengthened for the diffusion and a pore is stops the diffusion. On account of the lengthening of the route by way of the frame structure the possibility is presented of diminishing the layer thickness of the blocking layer as a whole.

As a result of the porosity a surface-enlargement of the material of the blocking layer develops. With bulk material, the surface is defined by length—breadth—thickness. The pore is to be seen as a thinning of the bulk material. The function of the pore and frame is interchanged, that is, the "filter effect" takes place by way of the frame.

For the blocking layer a total porosity of 1 to 55% by volume is of particular technical significance.

Advantageously, the porosity is graduated. The graduation can be designed on the basis of two different functions. The first principle is the tooth construction with the adjacent layers. The second principle is the direction of diffusion, that is, if the adjacent layer presents that substance that would diffuse across the material of the blocking layer, then here, for example, the blocking layer starts with a high proportion of pores that diminishes in the direction of the bulk material of the blocking layer. Since there are a great variety of possibilities for graduation here, this is to be regarded as an example and not as a restriction.

The blocking layer can lie between the electrolyte and the cathode. It can, however, also lie between the electrolyte and the anode. Furthermore, a combination of the layers can also be provided. The blocking layer can be applied by means of screen printing or laminating techniques or coating methods, such as spraying or roller coating.

The material of the blocking layer is of particular technical significance and consists, for example, of cerium oxide and/or technical cerium oxide and/or doped cerium oxide and/or zirconium oxide and/or technical zirconium oxide and/or doped zirconium oxide and mixtures thereof. As dopants, the oxides of Sm and Gd are to be mentioned by way of example. Technical substances always have a proportion of foreign substances and secondary constituents. Cerium oxide is as a rule obtained from a ground single crystal and therefore has the highest material purity.

Figure 4:
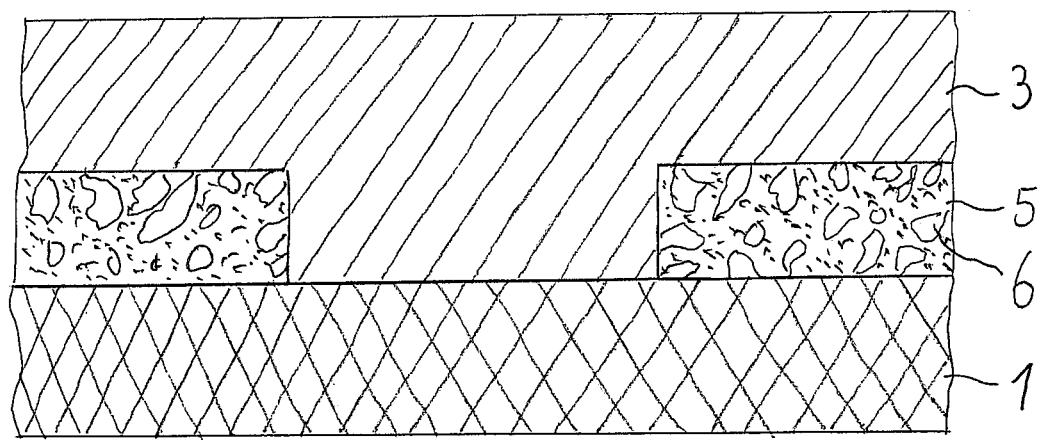

The blocking layer is applied to part of or all over at least one surface, as can be seen from FIG. 4.

The invention claimed is:

1. An arrangement for a fuel cell comprising:
   a cathode;
   an anode;
   an electrolyte; and
   a blocking layer having pores and pore channels therein such that the blocking layer has a porosity that is graduated and decreases from the electrolyte to the anode or from the electrolyte to the cathode in a direction going into the blocking layer;
   wherein the blocking layer is arranged between the electrolyte and the anode or between the electrolyte and the cathode, wherein the blocking layer contacts the anode or the cathode; and
   wherein none of the pore channels of the blocking layer extend through the blocking layer that render possible percolation of the electrolyte or cause a short circuit, wherein the fuel cell is a solid oxide fuel cell.

2. A fuel cell according to claim 1, wherein the blocking layer comprises a ceramic.

3. A fuel cell according to claim 1, wherein the total porosity of the blocking layer is from 1 to 55% by volume.

4. A fuel cell according to claim 1, wherein the blocking layer comprises a material and wherein the surface of the material of the blocking layer is enlarged by the porosity.

5. A fuel cell according to claim 1, wherein there is a lengthening of diffusion stretch for material diffusing into the blocking layer.

6. A fuel cell according to claim 1, wherein a mechanical tooth construction exists between at least one of the anode, cathode or electrolyte and the blocking layer as a result of material from the anode, cathode or electrolyte penetrating into a pore or pore channel in said blocking layer.

7. A fuel cell according to claim 2, wherein the ceramic comprises at least one member selected from the group consisting of cerium oxide, technical cerium oxide, doped cerium oxide, zirconium oxide, technical zirconium oxide and doped zirconium oxide.

8. A fuel cell according to claim 2, wherein the ceramic contains a dopant.

9. A fuel cell according to claim 1, wherein the blocking layer is applied to part of or all of at least one surface of the electrolyte, the anode or the cathode.

10. A fuel cell according to claim 1, wherein the blocking layer is applied by screen printing, laminating or coating.

11. A fuel cell comprising:
    a cathode;
    an anode;
    an electrolyte; and
    a blocking layer having pores and pore channels therein such that the blocking layer has a porosity; the blocking layer is arranged between the electrolyte and the anode or the cathode; and wherein the blocking layer contacts the anode or the cathode; and
    wherein none of the pore channels of the blocking layer extend through the blocking layer, wherein the fuel cell is a solid oxide fuel cell.

12. A fuel cell according to claim 8, wherein the dopant comprises a member selected from the group consisting of an oxide of Sm and an oxide of Gd.

13. A fuel cell according to claim 2, wherein the blocking layer is applied to part of or all of at least one surface of the electrolyte, the anode or the cathode.

14. A fuel cell according to claim 1, wherein the blocking layer is applied to part of or all of at least one surface of the electrolyte.

15. A fuel cell according to claim 1, wherein the blocking layer is applied to part of or all of at least one surface of the anode.

16. A fuel cell according to claim 1, wherein the blocking layer is applied to part of or all of at least one surface of the cathode.

17. A fuel cell according to claim 8, wherein the ceramic comprises at least one member selected from the group consisting of cerium oxide, zirconium and zirconium oxide.

18. A fuel cell according to claim 3, wherein the blocking layer comprises a ceramic.

19. A fuel cell according to claim 4, wherein the blocking layer comprises a ceramic.

20. A fuel cell according to claim 5, wherein the blocking layer comprises a ceramic.

21. A fuel cell according to claim 1, wherein the blocking layer inhibits solid-state chemical reactions.

22. A fuel cell according to claim 11, wherein the blocking layer inhibits solid-state chemical reactions.

23. A fuel cell comprising:
    a cathode;
    an anode;
    an electrolyte; and
    a blocking layer having pores and pore channels therein such that the blocking layer has a porosity; the blocking layer is arranged between the electrolyte and the anode or the cathode; and wherein the blocking layer is applied to a surface of the anode or a surface of the cathode; and
    wherein none of the pore channels of the blocking layer extend through the blocking layer, wherein the fuel cell is a solid oxide fuel cell.

* * * * *